A. W. CHIDDIX.
SAW.
APPLICATION FILED JUNE 14, 1920.
1,419,819.
Patented June 13, 1922.
3 SHEETS—SHEET 1.
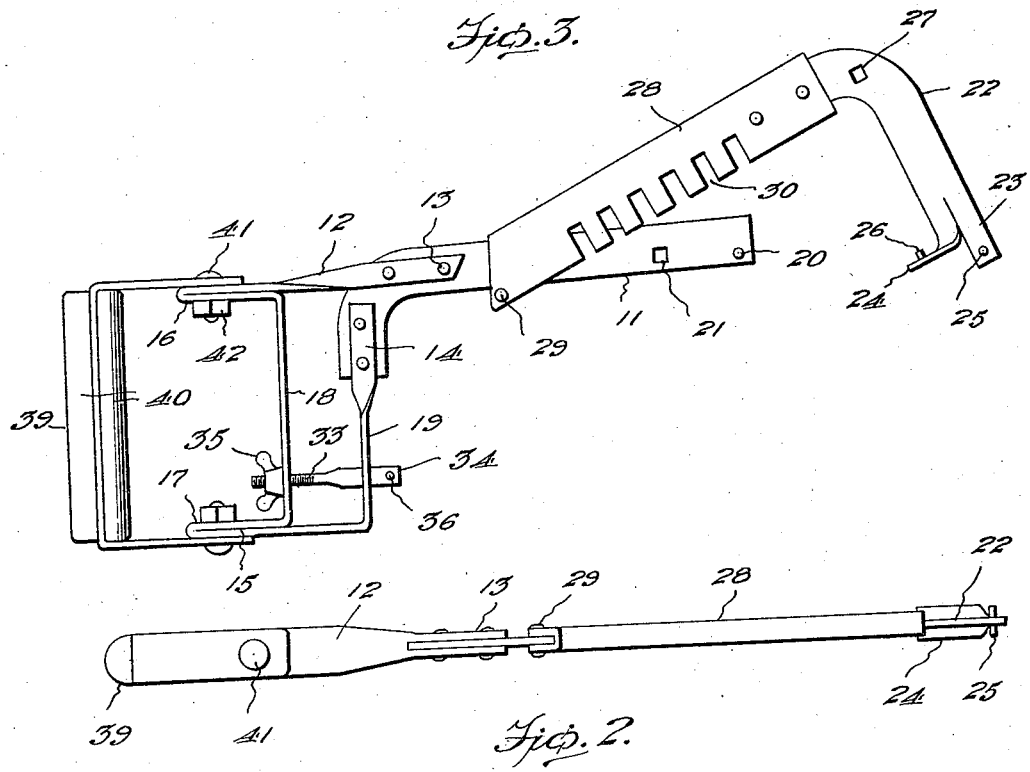
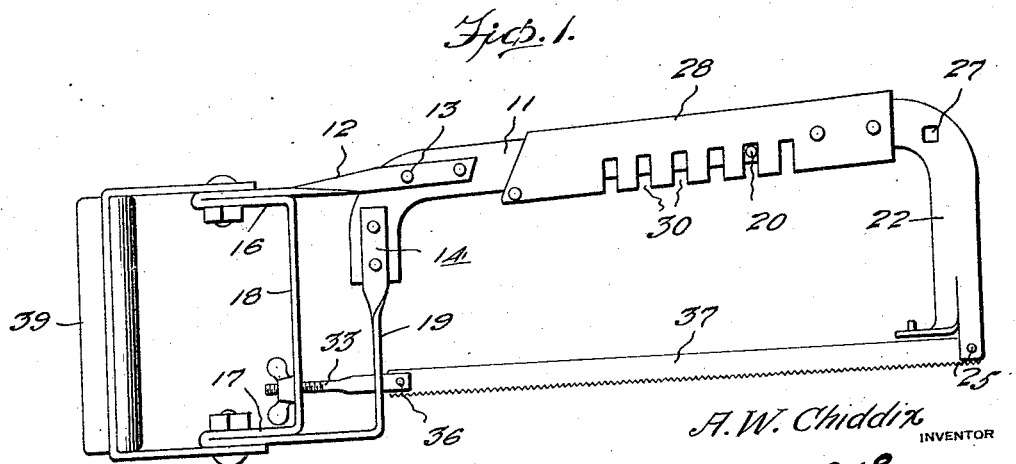
A. W. Chiddix
INVENTOR
BY Victor J. Evans
ATTORNEY
WITNESS:

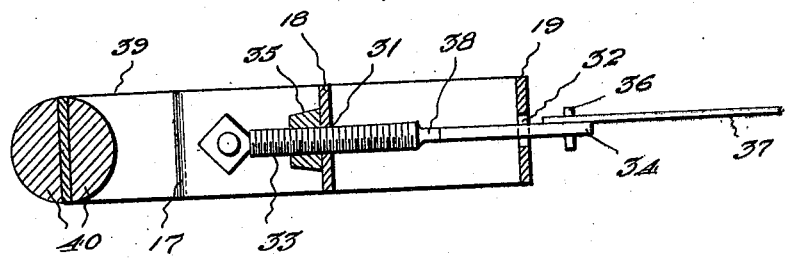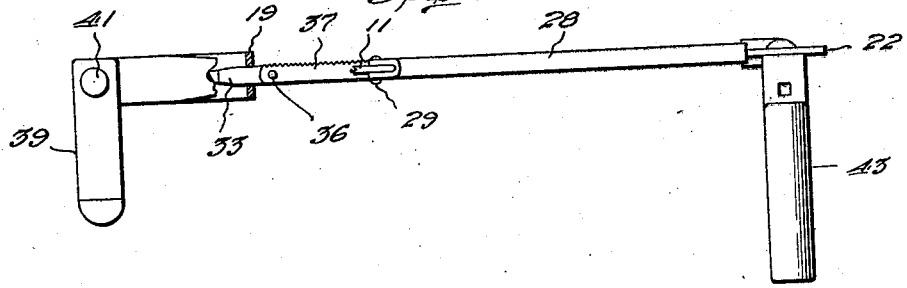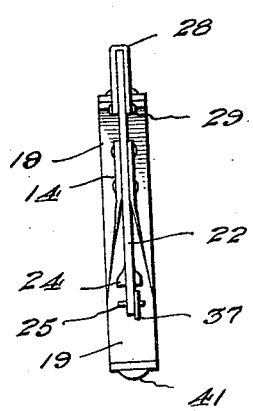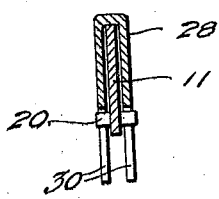

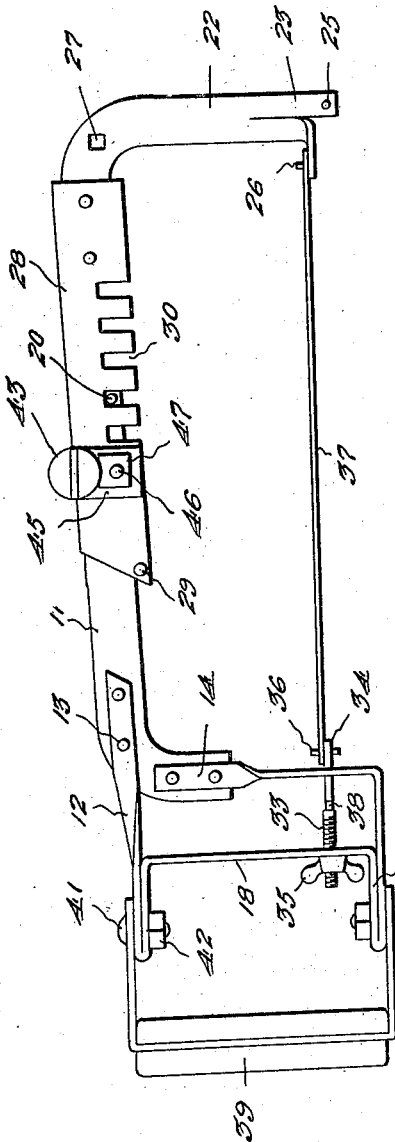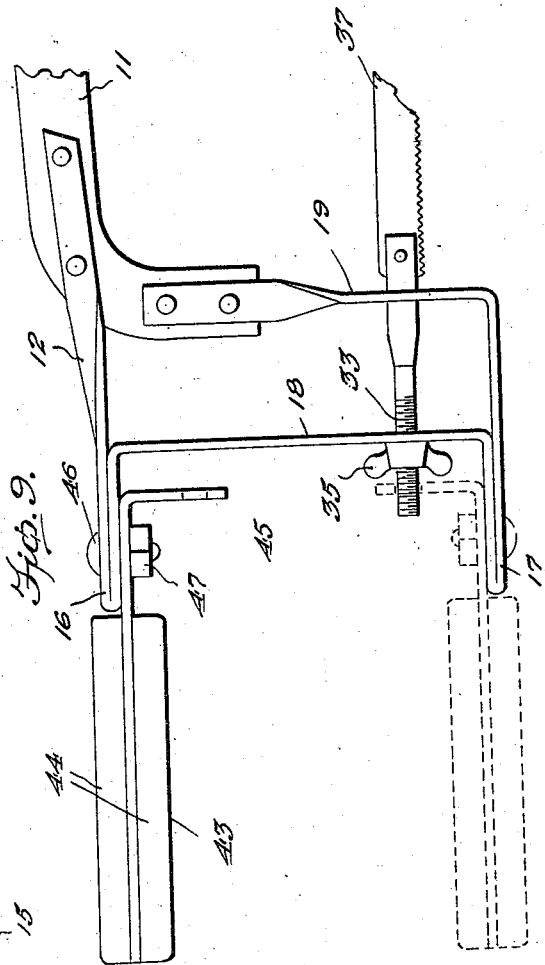

UNITED STATES PATENT OFFICE.

ALBERT WILSON CHIDDIX, OF LAMESA, TEXAS.

SAW.

1,419,819.  Specification of Letters Patent.  Patented June 13, 1922.

Application filed June 14, 1920. Serial No. 388,916.

*To all whom it may concern:*

Be it known that I, ALBERT WILSON CHIDDIX, a citizen of the United States, residing at Lamesa, in the county of Dawson and State of Texas, have invented new and useful Improvements in Saws, of which the following is a specification.

This invention relates to saws, particularly to those of the hack saw type, and has for its object the provision of a saw having a frame which is adjustable to accommodate blades of different lengths, the frame being moreover provided with a pair of handles which may be shifted into different position in order that the saw may be adapted for a wide variety of uses.

A very important object is the provision of a hack saw of this character, the parts of which are so constructed that they may be arranged so that the saw may be used for sawing off a bolt head or the like disposed immediately against a flat surface, the adjustability of the handle members and the shiftability of the blade permitting this action.

An additional object is the provision of a saw of this character which will be very simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of the saw with the parts arranged for ordinary use, Figure 2 is an edge elevation of the same, Figure 3 is a side elevation showing the parts swung into position to permit adjustability, Figure 4 is an end elevation, Figure 5 is a cross sectional view taken through the adjustably connected back portions of the frame, Figure 6 is a detail horizontal sectional view through the rear portion of the frame showing the screw member for holding the rear end of the blade, Figure 7 is a similar view showing this screw member extending to one side of the frame and the handles disposed at the opposite side for adapting the saw for use in cutting off a bolt head close to a wall, Figure 8 is a plan view showing the auxiliary handle disposed at the intermediate portion of the back of the frame and showing the main handle in normal position, Figure 9 is a similar view showing the auxiliary handle secured at the rear end of the frame in place of the main handle at the top thereof in full lines and at the bottom thereof in dotted lines.

Referring more particularly to the drawings, I have shown the main or rigid portion of the frame as formed of a substantially L-shaped bar 11 to which is secured a brace member 12 which is shown as formed of a strip of metal having one end secured upon a relatively long portion of the bar 11, as shown at 13, and having its other end secured upon the relatively short portion of the bar 11, as shown at 14. Intermediate its ends this strip is bent upon itself, as shown at 15, to provide upper and lower spaced lugs 16 and 17. The portion of the brace member connecting the lugs 16 and 17 is designed by the numeral 18 and the portion leading from the lower portion of the brace member to the shorter arm of the bar 11 is designated by the numeral 19. At its other end portion the long arm of the bar 11 is provided with a transversely extending pin 20 and the arm is also formed with a rectangular hole 21.

The movable portion of the frame comprises an L-shaped bar 22 which has the end of its shorter arm split to define two lugs 23 and 24, the latter of which is bent upwardly and disposed at right angles to the shorter arm. The lug 23 is provided with a transverse pin 25 and the lug 24 carries a vertically disposed pin 26. At its angle the bar 22 is provided with a square hole 27, for a purpose to be described. The longer arm 28 of the bar 22 is formed U-shaped in cross section and straddlingly engages the longer arm of the bar 11, the free extremity of the U-shaped portion being connected by a pin 29 engaging against the inner edge of the bar 11. The U-shaped longer arm 28 is provided with a series of notches 30 within any one of which may be engaged a pin 20 at the end of the bar 11. By this construction it will be seen that the movable portion of the frame is adjustable longitudinally with respect to the stationary or rigid portion whereby to vary the distance between the shorter arm of the movable portion and the member 19. The members 18 and 19 of the stationary frame have formed therein holes 31 and 32, respectively, the former being circular and the latter cruciform. Passing through the holes 31 and 32 is a longitudinally adjustable member 33 which has one end 34 rectangular in cross section and engageable within either of the slots forming the cruciform opening 32. The other end of this member 33 is cylindrical and threaded for passage through the hole 31 and carries an adjusting nut 35. The end 34 is provided with a transverse pin 36 upon which is engageable the hole in one end of a hack saw blade 37, the hole in the other end thereof being engaged upon the pin 25. It will be observed that the hack saw blade may be engaged upon the pins 36 and 25 at either side of the member 33 and lug 23, as preferred. After the blade is engaged upon these pins the clamping nut 35 is tightened to hold the blade taut. If desired, the nut 35 may be loosened a sufficient extent to permit the reduced neck portion 38 on the member 33 to be disposed within the cruciform opening 32 whereupon the member 33 may be partially rotated so that it may be engaged within the other slot of the opening 32 so that the pin 36 will be vertically disposed whereupon the blade 37 may be engaged upon the pin 36 and the pin 26 and be thus arranged in horizontal position.

Associated with the rigid portion 10 of the frame is a U-shaped handle 39 which has secured upon its bight portion at opposite sides thereof wooden grips 40. The arms of this handle 39 are disposed outwardly of and engaged against the lugs 16 and 17 and are pivotally connected therewith by means of bolts 41 carrying nuts 42. Under ordinary conditions the saw may be used with only this one handle and it will be observed that this handle may be moved to be disposed at various angles at either side of the saw, depending upon the character of the work in which it is employed.

I also make use of an auxiliary handle 43 which includes an L-shaped shank upon the longer portion of which are secured wooden grips 44 and the shorter arm 45 of which is provided with a hole. This auxiliary handle has associated therewith a bolt 46 and nut 47 whereby this handle may be secured at the forward end of the movable frame portion to extend from either side thereof, the bolt 46 passing through the hole 27. The disposition of the handle at this point enables the operator to hold the saw more firmly so that better work may be accomplished.

If desired, the auxiliary handle 43 may be disposed at the intermediate portion of the back of the frame with the bolt 46 passing through the hole 21 in the bar 11, it being understood of course that this hole 21 registers with one of the notches 30.

If desired, the main handle 39 may be removed and the auxiliary handle 43 be secured by means of its bolts 46 upon either of the lugs 16 or 17 so as to extend upwardly beyond the back of the saw or downwardly below the blade thereof.

When it is desired to use the saw for cutting off the head of a bolt or the like disposed against a wall or other flat surface, the member 33 is disengaged from the frame and is then positioned with its threaded portion passing through the hole 31 and its flattened portion 34 disposed against one side of the member 19. The saw blade is then engaged upon the pin 36 and the pin 25 and will be disposed entirely to one side of the frame. The auxiliary handle 43 is then disposed either at the end or the intermediate portion of the frame to extend therebeyond at the side opposite to that at which the blade is disposed. The main handle 39 is then adjusted to extend from the side opposite that at which the blade is secured. The saw may then be readily used for cutting off the bolt head or the like against a flat surface as the handles and the operator's knuckles will be prevented from contact with the wall or other surface.

While I have shown and described some of the various positions in which the main and auxiliary handles and the blade may be placed, it will be readily apparent that the blade may be inverted, disposed in various other positions, that the main handle may be swung to various angular positions, and that the auxiliary handle may be located in inverted position as well as at the different points upon the frame of the saw.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A saw of the character described comprising a frame longitudinally adjustable, a saw blade secured within said frame, a U-shaped handle having its arms connected with one end of the frame and pivotally mounted thereon whereby the position of the handle may be varied to extend from opposite sides of the frame at different angles with respect thereto, and an auxiliary handle capable of attachment at the upper portion of the other end of the frame at the intermediate portion of the frame and further adapted to replace said first named handle at either of the points of connection of the latter with the frame.

2. A saw comprising a frame having a blade disposed therein, lugs formed at one end of the frame at the upper and lower portions thereof, a U-shaped handle having its arms removably and pivotally connected with said lugs whereby the handle may be disposed to extend beyond either side of the frame, and an auxiliary handle detachably connected with the other end of the frame at its upper portion.

3. A saw of the character described comprising a frame of substantially U-shape, a strip secured at one end of the frame and bent and rebent at spaced points whereby to define a brace member disposed in parallel relation to one end of the frame and to define spaced lugs, a threaded member disposed through a hole in said brace member and slidable through an opening in the adjacent side of the frame, said member having a transverse pin engageable by the hole in one end of the blade, a pair of pins at the opposite end of the frame and disposed at right angles to each other and selectively engageable by the hole in the other end of the blade, said threaded member being disposable in either of two planes whereby the blade may be disposed in the same plane with the frame or in a plane at right angles thereto, a clamping nut threaded upon said threaded member, and a handle at the end of the frame and connected with said lugs.

4. A saw of the character described comprising a frame of substantially U-form, a strip secured at one end of the frame and bent and rebent at spaced points whereby to define a brace member disposed in parallel relation to one end of the frame and to define spaced lugs, a threaded member disposed through a hole in said brace member and slidable through an opening in the adjacent side of the frame, said member having a transverse pin engageable by the hole in one end of the blade, a pair of pins at the opposite end of the frame and disposed at right angles to each other and selectively engageable by the hole in the other end of the blade, said threaded member being disposable in either of two planes whereby the blade may be disposed in the same plane with the frame or in a plane at right angles thereto, a clamping nut threaded upon said threaded member, and a handle at the end of the frame and connected with said lugs, said handle being disposable to extend beyond one side of the frame and said threaded member being capable of disposition within the hole in said brace member with one end lying against the adjacent side of the frame whereby the saw blade may be disposed entirely at one side of the frame.

In testimony whereof I affix my signature.

ALBERT WILSON CHIDDIX.